United States Patent [19]
Kirk

[11] Patent Number: 4,709,347
[45] Date of Patent: Nov. 24, 1987

[54] METHOD AND APPARATUS FOR SYNCHRONIZING THE TIMING SUBSYSTEMS OF THE PHYSICAL MODULES OF A LOCAL AREA NETWORK

[75] Inventor: David L. Kirk, Phoenix, Ariz.

[73] Assignee: Honeywell Inc., Phoenix, Ariz.

[21] Appl. No.: 682,645

[22] Filed: Dec. 17, 1984

[51] Int. Cl.⁴ .............................................. G06F 9/00
[52] U.S. Cl. .................................. 364/900; 340/825.5
[58] Field of Search ...................... 340/825.5; 370/82; 364/200, 900

[56] References Cited

U.S. PATENT DOCUMENTS

| | | | |
|---|---|---|---|
| 3,919,695 | 11/1975 | Gooding | 364/200 |
| 3,932,847 | 1/1976 | Smith | 364/200 |
| 4,410,889 | 10/1983 | Bryant et al. | 370/94 |
| 4,430,651 | 2/1984 | Bryant et al. | 340/825.5 |
| 4,493,021 | 1/1985 | Agrawal et al. | 364/200 |
| 4,570,162 | 2/1986 | Boulton et al. | 340/825.5 |

Primary Examiner—Gareth D. Shaw
Assistant Examiner—John G. Mills
Attorney, Agent, or Firm—A. A. Sapelli; A. Medved

[57] ABSTRACT

Method and apparatus for synchronizing to a desired degree of accuracy the timing subsystems of the modules of a distributed local area network by the master and the slave. Each module includes a Module Central Processing Unit (MCPU) and a source of clock signals. Each MCPU includes a digital timing subsystem which produces a fine timing, a synchronization, and a real time timing signal. Two of the timing subsystems are provided with driver circuits one designated as the master and the other as the slave. Each timing subsystem, alternately receives the timing frames transmitted over the two cables of the network by the master and the slave. All timing subsystems other than the master, synchronize with the master. The slave transmits its timing frame in synchronization with the master.

6 Claims, 10 Drawing Figures

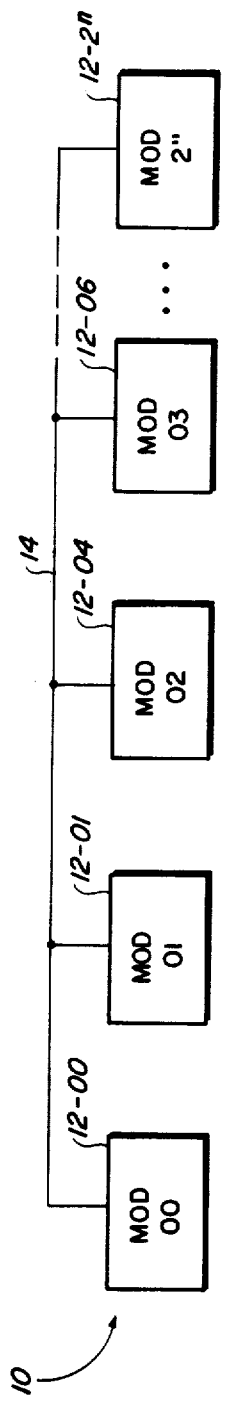
Fig.1
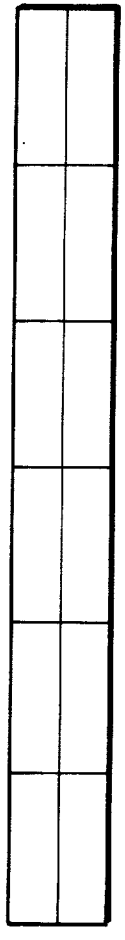
Fig.9B

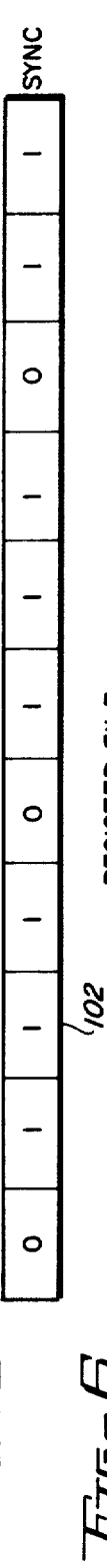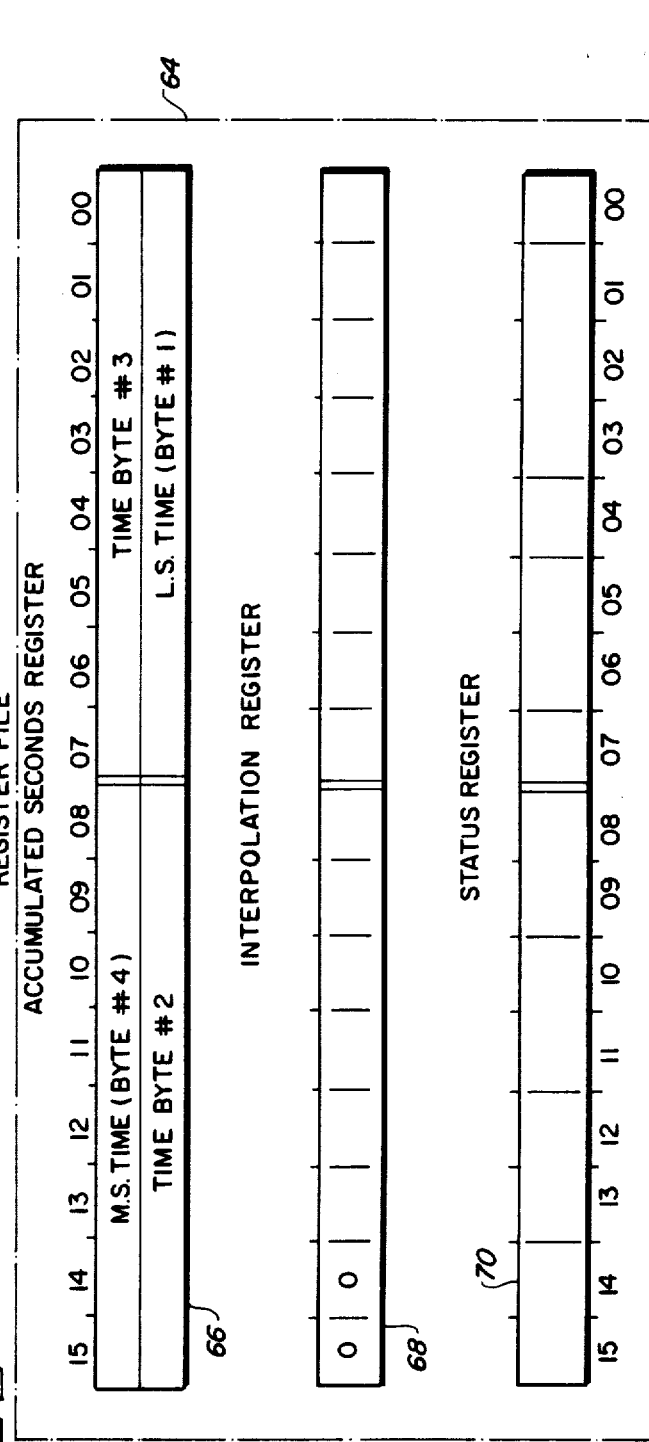

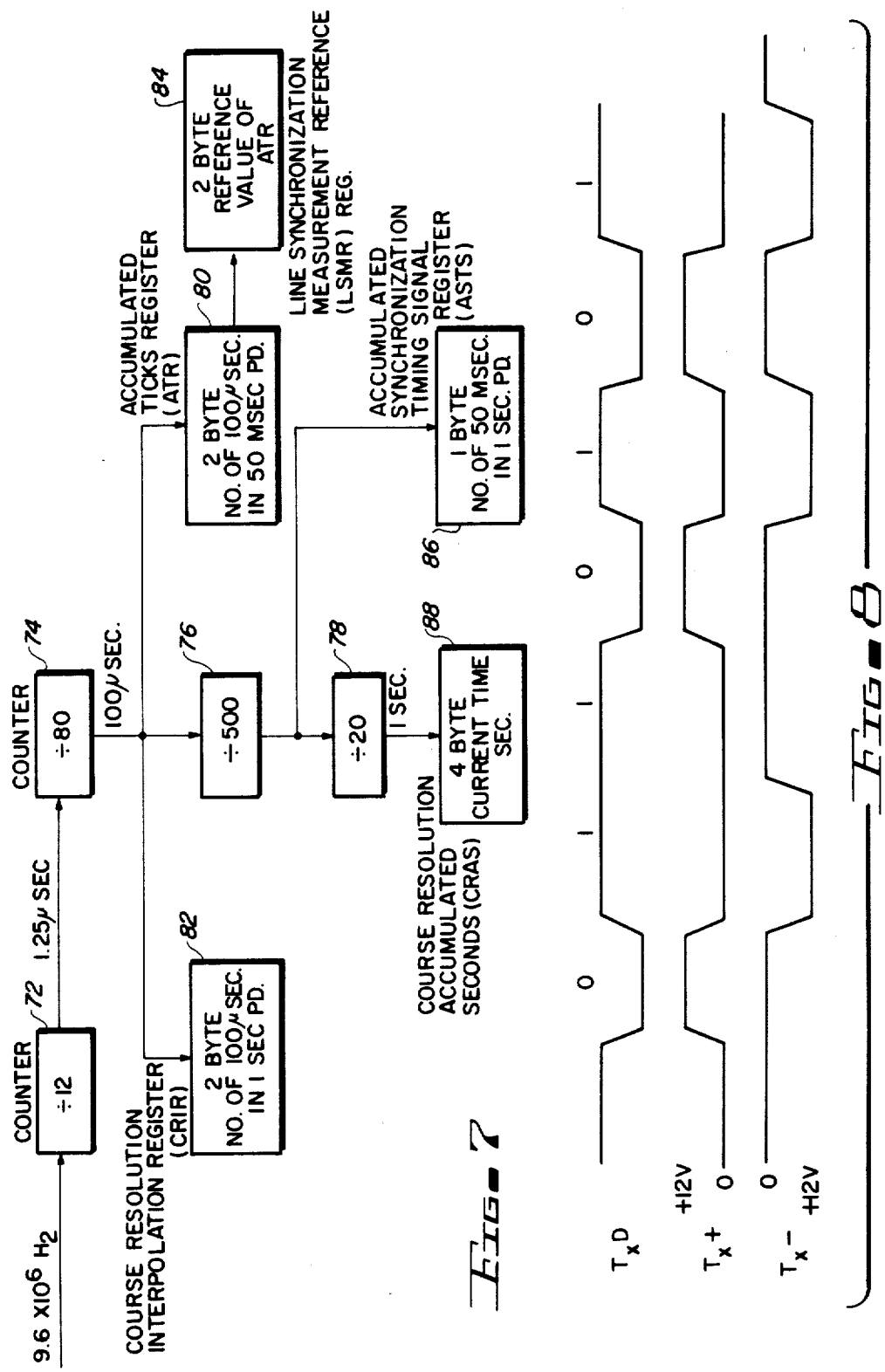

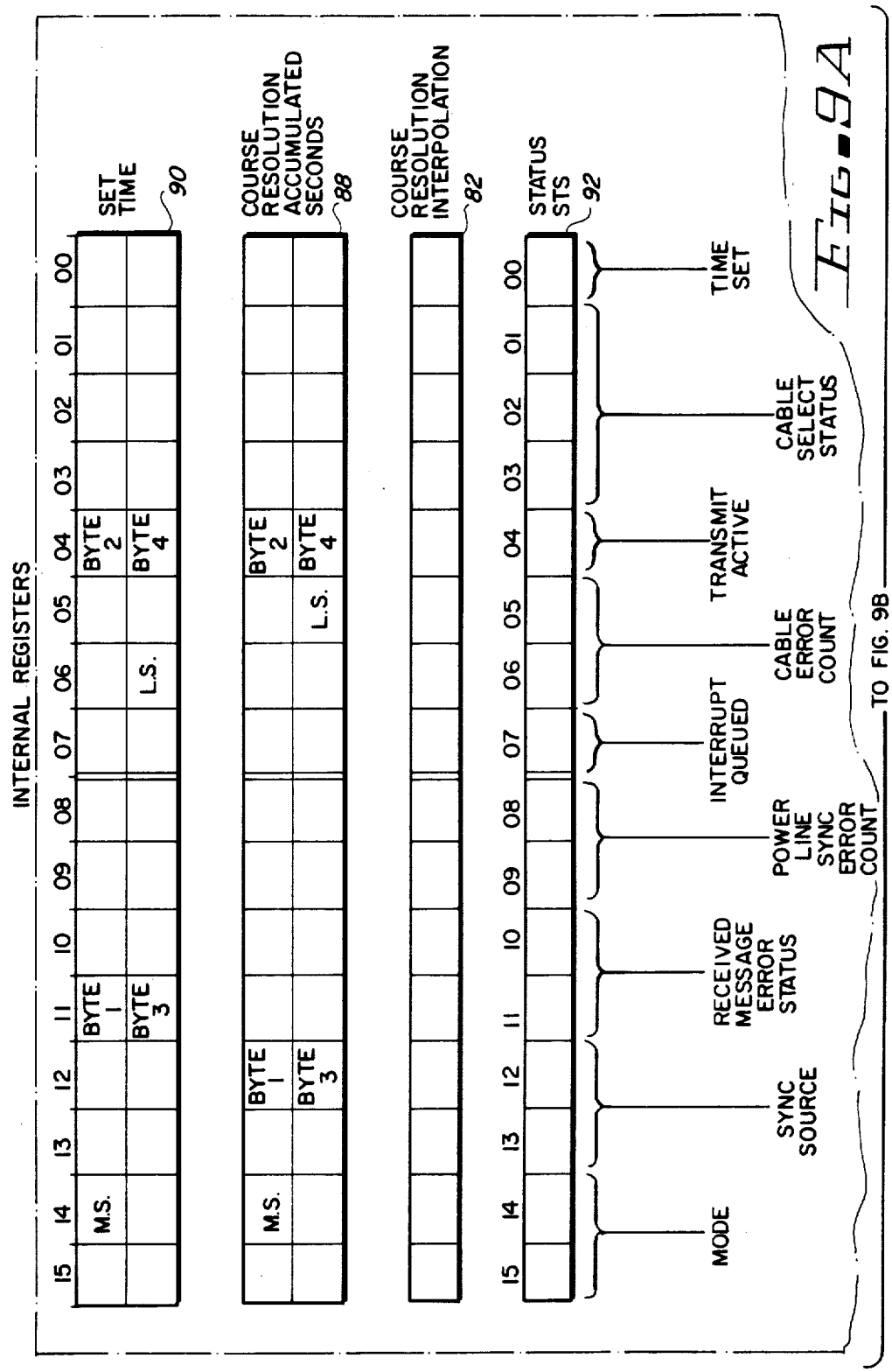

METHOD AND APPARATUS FOR SYNCHRONIZING THE TIMING SUBSYSTEMS OF THE PHYSICAL MODULES OF A LOCAL AREA NETWORK

BACKGROUND OF THE INVENTION

1. Field of the Invention

This invention is in the field of local area networks in which a plurality of physical modules of the network communicate with one another over a network bus, and more particularly relates to methods and apparatus of synchronizing the timing subsystems of each of the modules so that they are snychronized within a predetermined degree of accuracy.

2. Description of the Prior Art

A computerized plan management system is described and claimed in co-pending Application No. 06/540,061 filed Oct. 7, 1983, now U.S. Pat. No. 4,607,256 entitled PLANT MANAGEMENT SYSTEM by Russell A. Henzel, which application is assigned to Honeywell Inc., the assignee of this application. The disclosure of Application No. 06/540,061 is hereby incorporated by reference into this application. Such a system is composed of a plurality of physical modules having varying capabilities and functionalities which communicate with one another over a common communication medium, or local control bus, to form a token-passing local area network. Each of the physical modules of the network is the equal, or peer, of the other, and each of the modules includes at least a module central processor unit (MCPU), and a module memory unit (MMU). Additional controllers and devices are added to a physical module to provide it with the ability to perform desired functions. A network of this type provides a distributed data processing environment with a concomitant increase in reliability over centralized systems since if one module fails, the network as a whole is not disabled as would be the case with a failure of a centralized system. Reliability is also improved by permitting redundancy of the physical modules of the network to the extent necessary to achieve desired system availability. Such a token-passing local control network consisting of a plurality of different types of physical modules also permits functional capabilities to be added or deleted incrementally.

One of the requirements for a computerized plant management system is that of timing the occurrence of events with a high degree of precision. A centralized timing system which could be used to satisfy the timing requirements of such a plant management system would do so to the detriment of the systems' objectives of improved reliability through redundancy at the module level, of minimizing the cost of the system, and of providing additional capabilities, or modifications, to the network through the addition and deletion of physical modules since a centralized timing subsystem could not readily satisfy these objectives.

SUMMARY OF THE INVENTION

The present invention provides both method and apparatus for synchronizing to a desired degree of accuracy the timing subsystems with which each module central processor unit (MCPU) of each physical module of a local area network is provided. In such a network each physical module is the peer of every other physical module, and the physical modules of a network communicate with each other over a common, dually redundant, communication medium, i.e., two coaxial cables. Each physical module which is connected to the cables of the communication medium has the capability of transmitting bit serially binary data over these two cables at a relatively high bit rate and of receiving such signals transmitted by another module. The MCPU of each physical module includes a source of clock signals at substantially the same frequency.

The MCPU's clock signals are applied to its associated timing subsystem. Each timing subsystem produces three timing signals with each timing signal having a different period, one for fine timing, or resolution, a second for synchronization, and a third for determining the current, or real, time to the nearest second. Each timing subsystem keeps track of, or counts, the number of fine resolution and synchronization timing signals produced by it since the most recently produced real timing signal, or one second rollover, occurred. Each timing subsystem also keeps track of the current time in terms of years, months, days, hours, minutes and seconds which is expressed in seconds. Each timing subsystem counts the number of fine resolution timing pulses since the previous synchronization timing pulse rollover, or mark. In addition each timing subsystem generates certain status information concerning its operation.

The timing subsystems of at least two of the MCPU's of the network are provided with a driver circuit which when the timing subsystems is enabled by its associated MCPU permits the timing subsystems to periodically transmit timing information. Timing information is included in a timing frame which timing frames are transmitted over one of the two cables of the systems communication medium. One of the two timing subsystems equipped with a driver circuit is designated as the master and the other as the slave. The master timing subsystem transmits over one of the two cables and the slave over the other. The master and slave when the system is operating properly periodically transmit a timing frame, a set of 12 characters in the preferred embodiment, the bits of which are transmitted over the cables of the bus bit serially at a relatively low frequency. The frequency at which timing frames are transmitted is chosen so as not to interfere with the transmission of the higher bit rate signals which are also transmitted over the cables of the bus by the physical module. Each timing frame includes a synchronization code, a special set of binary signals; information as to the number of synchronization timing signals that have occurred, or have been produced since the previous one second rollover, or mark; the current, or real, time in seconds; and status information.

A timing frame is transmitted by the master and slave timing subsystems for each synchronization timing signal produced by it. The receipt of a synchronization code of a timing frame by a physical modules connected to the local control network bus is timed to coincide with the production of a synchronization timing signal by the timing subsystem, master or slave. Each timing subsystem, including the master and the slave, alternately receive timing frames from each of the two cables of the communication medium. Each timing subsystem other than the master can be commanded to synchronize its production of its synchronization timing signals with the receipt of the synchronizing code of each timing frame received from the cables of the LCN bus, and to synchronize its current real time with that of received timing frames.

Each timing subsystem also has the capability, when enabled, of synchronizing its internal sense of time with the frequency of its A.C. power supply. In addition, each timing subsystem has the ability to determine if the master or slave, or both timing subsystems are operating within specified limits of accuracy. The slave if it detects that the master timing subsystem is operating out of specified limits of accuracy will cease to synchronize on the timing frames transmitted by the master and thereafter will operate as a master relying on its MCPU's module clock as its source of accurate timing signals.

It is therefore an object of this invention to provide improved methods and apparatus for synchronizing the timing subsystems of the MCPU's of each physical module of a local area network plant control system.

It is another object of this invention to provide method and apparatus for providing timing information to each module of a distributed local control network with the required degree of accuracy, with the desired degree of reliability through redundancy, and at minimum cost.

It is yet another object of this invention to provide method and apparatus for synchronizing the timing subsystems of the modules of a local area plant control network in which synchronization signals are transmitted by designated modules over the same cables that are used to transmit all other types of information between the modules but at a different non-conflicting frequency.

It is still another object of this invention to provide a distributed timing subsystem for a plant control network in which each of the timing subsystems can be synchronized with the frequency of the source of A.C. electric power for the system.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be affected without departing from the spirit and scope of the novel concepts of the disclosure, and in which:

FIG. 1 is a schematic block diagram of a local area control network.

FIG. 4 illustrates the format of a timing frame.

FIG. 5 is the format of a synchronizing character, or code, the first character of the timing frame illustrated in FIG. 4.

FIG. 6 illustrates the information stored in the register file of each timing subsystem.

FIG. 7 is a schematic block diagram illustrating how each timing subsystem produces various timing signals, the relationship between the timing signals, and the manner of keeping track of time to the required degree of accuracy.

FIG. 8 illustrates the wave forms used to transmit timing information over the local control network cables.

FIGS. 9A and 9B illustrate the internal registers and the informational content of these registers utilized by each of the timing system of the MCPU of each physical module of a local area network.

DESCRIPTION OF THE INVENTION

The architecture of local area network 10 in which the method of this invention is practiced and the apparatus of this invention is incorporated is illustrated in FIG. 1. Physical modules 12-00 to 12-2$^n$, where n is an integer greater than one, communicate with each other over local control network (LCN) bus 14. In network 10, each of the modules 12 is the equivalent, or the peer, of the others, and all modules 12 receive all signals transmitted over bus 14 by any of the other modules.

Figure 2:
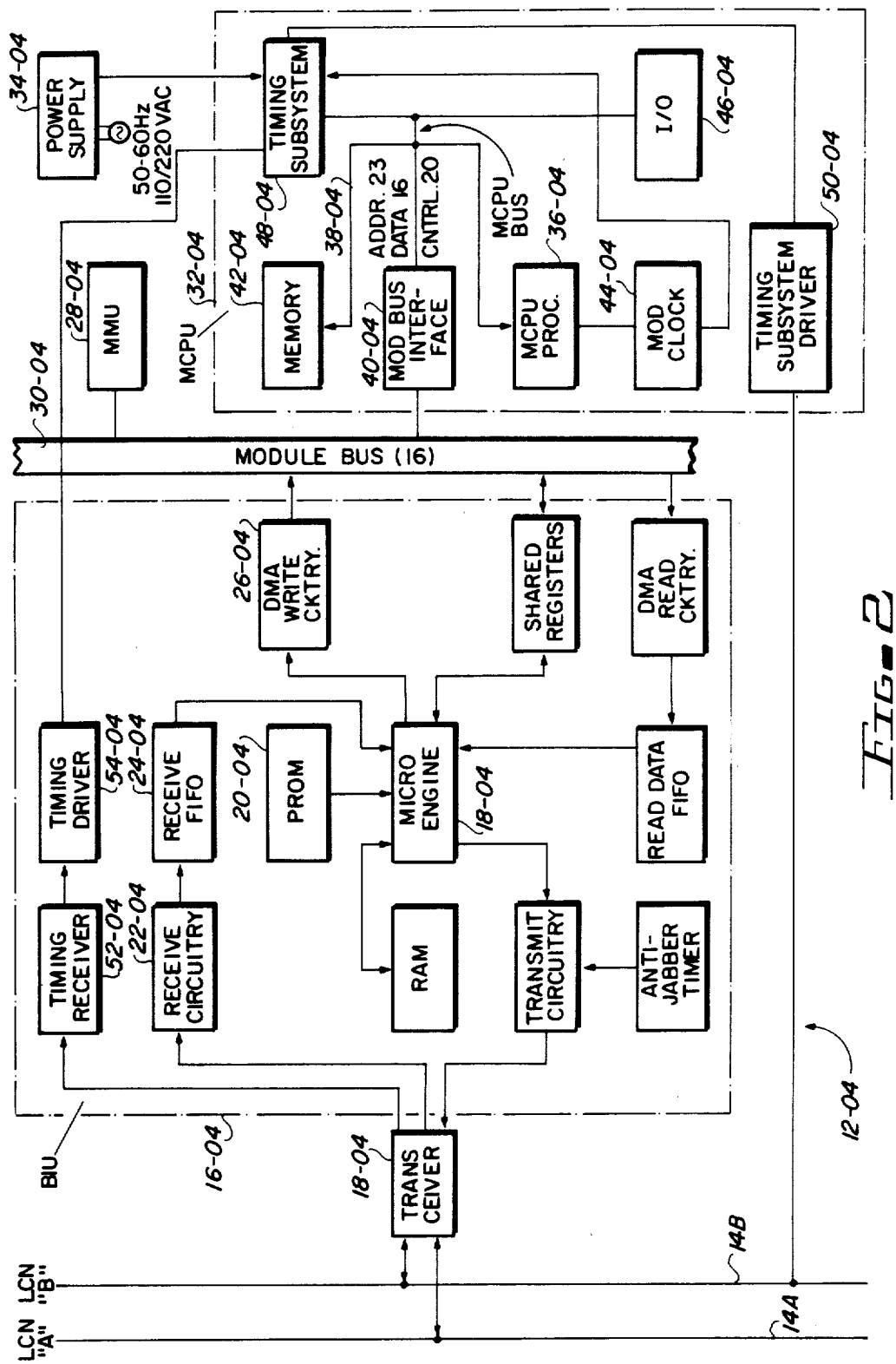
FIG. 2 is a block diagram of the relevant portions of a physical module of a local area plant control network.

Each module 12, such as module 12-04 which is illustrated in FIG. 2 includes a bus interface unit (BIU) 16-04 and a transceiver 18-04 which connects BIU 16-04 to dually redundant LCN buses 14-A and 14-B. BIU 16-04 is capable of transmitting binary data over buses 14-A and 14-B and of receiving data from buses 14-A and 14-B. Transceiver 18-04, in the preferred embodiment, is transformer coupled to each of the buses 14-A and 14-B. In the preferred embodiment each of the buses 14-A and 14-B is a coaxial cable with the capability of transmitting bit serially data at a five megabit/second rate. BIU 16-04 is provided with a very fast microengine 18-04. In the preferred embodiment, microengine 18-04 is made up of bit slice components so that it can process eight bits in parallel, and can execute a 24 bit microinstruction from its programmable read only memory (PROM) 20-04 in 200 nanoseconds.

Five megabit signals received from either of LCN buses 14-A or 14-B are transmitted by transceiver 18-04 and receiver circuitry 22-04 to receive FIFO register 24-04. Microengine 18-04 examines the data stored in register 24-04 and determines if the information is addressed to module 12-04. If the data is an information frame, the received data is transferred by direct memory access (DMA) write circuitry 26-04 by conventional direct memory access techniques to module 12-04's module memory unit (MMU) 28-04 over module bus 30-04.

MMU 28-04 and MCPU 32-04 communicate with each other and BIU 16-04 by means of module bus 30-04. Other functions of BIU 16-04 are described in copending application Ser. No. 06/540,062 filed Oct. 7, 1983 entitled METHOD FOR PASSING A TOKEN IN A LOCAL-AREA NETWORK, by Tony J. Kozlik, which application is assigned to the same assignee as this invention. The disclosure of the above identified application is hereby incorporated by reference into this application.

Each and every physical module 12 of local area, or control, network 10 such as module 12-04 illustrated in FIG. 2 includes a BIU 16, a transceiver 18 a module memory unit 28, an MCPU 32, and a power supply 34, which converts either 50 or 60 H$_z$ A.C. to the necessary D.C. voltage levels utilized by the components of a module 12.

Communication between MCPU processor 36-04, a Motorola 68000 microprocessor in the preferred embodiment, and other functional elements of MCPU 32-04 is via local microprocessor bus 38-04. Module bus interface element 40-04 provides the communication link between local bus 38-04 and module bus 30-04. Processor 36-04 executes instructions fetched from either its local memory 42-04, in the preferred embodiment an EPROM, or from MMU 28-04. Processor 36-04 has a crystal controlled clock 44-04 which produces clock pulses, or timing signals substantially at a rate of 9.6 × 10$^6$ H$_z$ in the preferred embodiment. Input- /output (I/O) port 46-04 provides communication between MCPU 32-04 and equipment external to module 12-04 to permit program loading, and the diagnosis of errors, or faults, for example.

Each MCPU 32 such as MCPU 32-04 also includes a timing subsystem 48-04 which, in response to clock signals from module clock 44-04 produces fine resolution, synchronization, and real time, timing signals. The real time timing signals occur, or are produced, at one second intervals so that each timing subsystem 48 has the capability of producing, or having available the current or real time in seconds. Any timing subsystem 48 which is provided with a timing subsystem driver 50, such as 50-04, has the capability of transmitting timing information to other modules over one of the LCN buses such as LCN-B, cable 14-B as illustrated in FIG. 2. Another input to each timing subsystem 48, such as timing subsystem 48-04, is timing information which is transmitted over LCN cables 14-A or 14-B and which is received through transceiver 18-04, receiver 52-04 and driver 54-04 of BIU 18-04. Timing pulses from module power supply 34-04 which are a function of the frequency of the external source of A.C. electric power applied to power supply 34-04 are used by timing subsystem 48-04 to correct longer term frequency drift of the clock pulses produced by clock 44-04.

Figure 3:
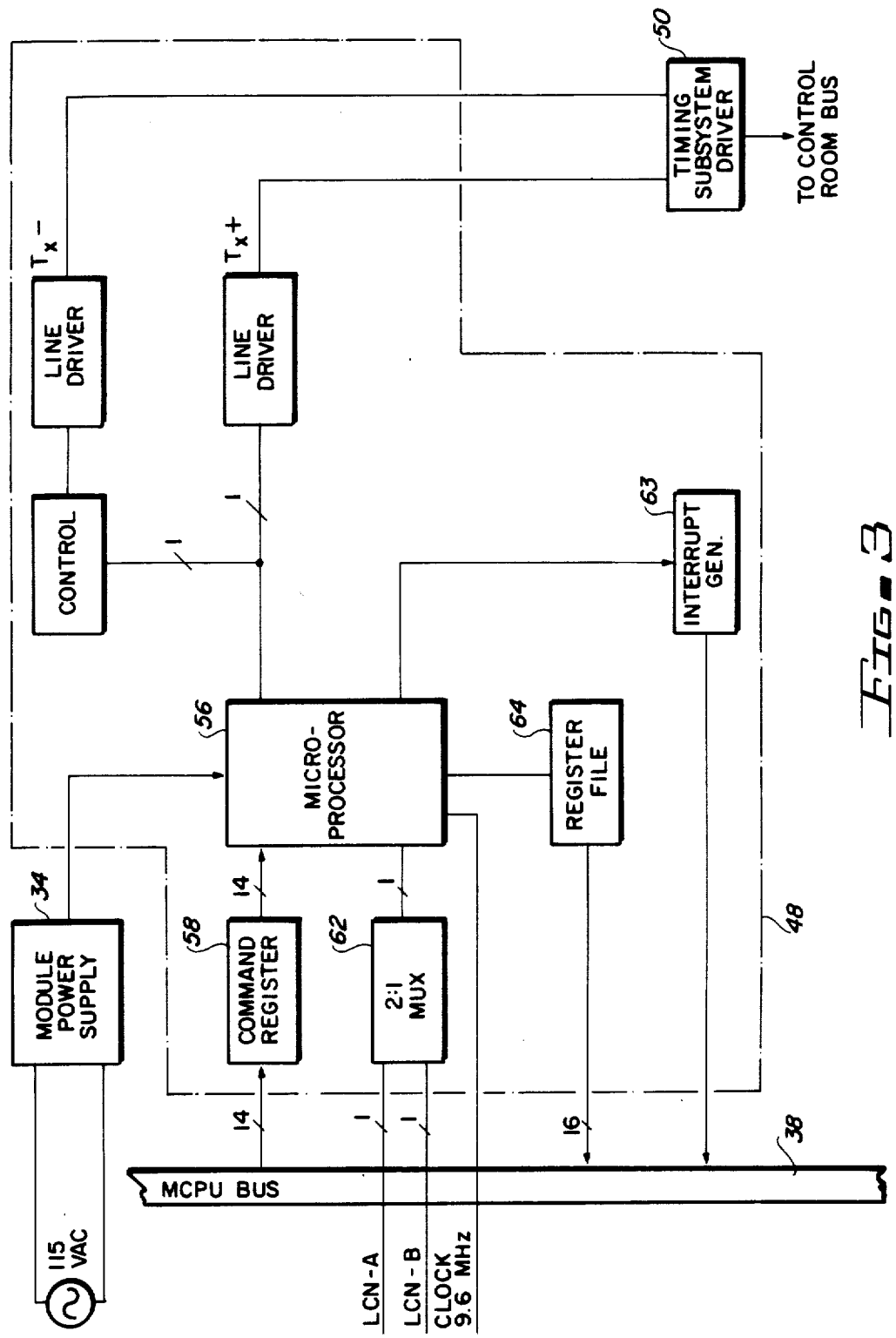
FIG. 3 is a block diagram of the timing subsystem of a MCPU.

In FIG. 3, the components of a timing subsystem 48 with which each MCPU 32 of each module 12 of system 10 is provided are illustrated. Timing subsystem 48 includes a single chip microprocessor 56 such as an Intel 8051. MCPU processor 32 can transmit to its timing subsystem 48 over MCPU bus 38 commands and data, such as "clock set" data through command register 58. Commands consist, in the preferred embodiment, of a six bit byte and data consists of an 8 bit byte, the bits of which are transmitted in parallel over a 14 conductor bus connecting MCPU bus 38 and command register 58.

The format of the coded timing information transmitted by timing subsystem 48; namely, timing frame 60, is illustrated in FIG. 4. A timing frame 60 is periodically transmitted over buses 14-A and 14-B respectively by timing subsystems 48 designated as the master and the slave. Timing frames 60 so transmitted are received by the transceiver 18, receiver 52 and driver 54 of each physical module 12 and are applied by driver 54 to 2:1 multiplexer 62 with which each timing subsystem 48 is provided. In normal operation, multiplexer 62 alternately transmits to microprocessor 56 timing frames 60 received from bus 14-A and bus 14-B. A third input to microprocessor 56 is the 9.6 megaherz (MHz) clock pulses produced by module clock 44. The fourth input to microprocessor 56 is an A.C. reference timing signal, or pulse, produced by module power supply 34. In the preferred embodiment this pulse is a repetitive substantially rectangular signal at twice the frequency of the external A.C. power supplied to power supply 34. Microprocessor 56 uses the A.C. reference timing signal from module power supply 34 when commanded by its MCPU processor 36 to synchronize its internal sense of time with that of the frequency of the A.C. power applied to module power supply 34.

One way microprocessor 56 communicates with its associated MCPU processor 36 is by precisely spaced, or timed, interrupts at 50 m sec. and 1 second intervals, which interrupts are produced by interrupt generator 63. In addition microprocessor 56 communicates through register file 64 and MCPU bus 38 with MCPU processor 36 of MCPU 32.

Register file 64 stores eight 8 bit bytes of data, the format of which as is illustrated in FIG. 6. Register file 64 includes an accumulated seconds register 66, an interpolation register 68, and a status register 70. Accumulated second register (ASR) 66 contains 4 bytes of data, representing the current time in terms of years, months, days, hours, minutes, and seconds, of the current century, expressed in seconds in the preferred embodiment. The current time is loaded into register 66 on initialization of a timing subsystem 48 and is updated each second thereafter. Interpolation register 68, a two byte register, has stored in it the number of fine resolution timing signals, produced since the last one second rollover. The period of a fine resolution timing signal, in the preferred embodiment, is 100 microseconds (u sec.) The contents of register 68 are updated every 100 u sec. Status register 70, another two byte register, contains a status word, the informational content of which will be explained below.

Each timing subsystem 48 of an MCPU 32 maintains its own, or its internal, sense of time. To do this each microprocessor 56 performs the operations and stores in designated registers its "internal sense of time." Referring to FIG. 7, clock signals from module clock 44 having a frequency of $9.6 \times 10^6 \pm 0.05\%$ $H_z$, in the preferred embodiment, are divided by twelve by counter 72 to produce internal timing signals having a 1.25 u sec. period. The 1.25 u sec. signals are divided by timer counter 74 to produce fine resolution timing signals having a period of 100 u sec. The 100 u sec. fine resolution timing signals are in turn divided by 500 by counter 76 to produce synchronization timing signals having a period of 50 milliseconds (m sec.). Finally, the 50 m sec. signals are divided by 20 by counter 78 to produce real time timing signals having a period of one second.

The 100 u sec. fine resolution signals from counter 74 are applied to accumulated ticks register (ATR) 80 and course resolution interpolation register (CRIR) 82. ATR 80, in the preferred embodiment, is a two byte register in which is stored the number of 100 u sec. signals, or periods, in the present, or current, 50 m sec. period. CRIR 82 is also a two byte register in which is stored the number of 100 u sec. periods, or signals in the present, or current, one second period.

Synchronization timing signals having a 50 m sec. period are applied to accumulated synchronization timing signal register (ASTS) 86. ASTS 86 is a one byte register in which is stored the number of 50 m sec. periods, or timing signals, in the current one second period. One second, or real time, timing signals produced by counter 78 are applied to course resolution accumulated seconds register (CRAS) 88. CRAS 88 is a four byte register in which is stored the current, or real, time in seconds. This data constitutes the current time in terms of years, months, days, hours, minutes and seconds of the current century. On initialization, the current time to the nearest second is loaded into CRAS 88 from set time register 90 which is illustrated in FIG. 9. The contents of CRAS 86 are incremented by one each time counter 78 produces a one second timing signal.

In FIG. 9, the internal registers of microprocessor 56 of each timing subsystem 48 and the format of the data stored in them are illustrated. These internal registers are, in the preferred embodiment, addressable memory locations of the internal random access (R.A.M.) memory of microprocessor 56, which memory locations function as registers. Set time register (SET) 90 is a 4 byte register into which at initialization, or upon a time information update, 4 bytes of time data from MCPU processor 36 are entered. The communication between MCPU processor 36 and its associated timing subsystem 48 is through command register 58. The contents of course resolution accumulated seconds (CRAS) register 88 and course resolution interpolation register (CRIR) 82 were described previously with respect to each timing subsystem 48's procedure for producing, or maintaining, its own internal sense of time.

Another internal register is status word (STS) register 92. STS register 92 is a 2 byte register which contains the present status of its timing subsystem 48. Bit 00, the least significant bit, if set, indicates that a time set operation is in progress. If the timing subsystem 48 is functioning as a source of timing signals, either master or slave, then the time information being transmitted in the timing frame 60 contains new "seconds" information. Bit 00, when set, indicates that the expected time image stored in expected time image register 98 has new second information that will be written into accumulated seconds register 88 at the next 1 second mark. It is also set when a time set command is received by a timing subsystem 48 from its MCPU processor 36, or from a received timing frame 60. Bit 00 is reset when the first 50 m sec. interrupt is issued following the 1 second interrupt at which the new seconds information is read into course resolution accumulated seconds register 88. Bit positions 03, 02, and 01 identify cable status. If bit positions 01 and 02 are both zeros, the timing subsystem did not receive a timing frame 60 from either cable during the previous 50 m sec. period. If bit position 01 is a 1 and bit position 02 is a 0, the timing subsystem received a timing frame from LCN-A cable during the most recent 50 m sec. period. If bit position 01 is zero and bit position 02 is a one the timing subsystem received a timing frame from LCN-B during the most recent 50 m sec. period. If bit 03 is set, then the timing subsystem is receiving timing frames alternately from cable 14-A and 14-B. Bit 04, if set, indicates that the timing subsystem has been enabled to transmit by its MCPU processor 36 and as a result it will transmit a timing frame 60 every 50 m sec. If bit position 04 is cleared, timing subsystem 48 is not transmitting. Bit positions 05 and 06, contain the number of errors detected on the cable identified by bit positions 01 and 02 during a one second interval. This field is set to zero just prior to presenting the first 50 m sec. interrupt following the posting of a 1 second interrupt. Bit 07, when set, denotes that at the time of posting an interrupt, a prior interrupt had not been acknowledged by MCPU processor 36. Bit 07 will remain set until the posting of the first interrupt following a status change interrupt which indicates that the queued interrupts have been serviced by MCPU 56. Bits 08 and 09 contain the number of errors detected in the A.C. reference timing signals produced by module power supply 34 during a 1 second interval if synchronization with the frequency of the A.C. power supply has been commanded by MCPU processor 56. This field is set to zero prior to presenting the first 50 m sec. interrupt following each 1 second interrupt. Bits 10 and 11 indentify received message error status. If Bits 10 and 11 are both zeroes, no errors were detected in the timing frame 60 received during the past 50 m sec. If Bytes 11 and 10 are a zero and a 1 respectively, then a communication error such as a parity error, or an error in the number of bits in a timing frame, was detected in a timing frame received during the previous 50 m sec. period. If bit 11 is a 1 and bit 10 is a zero, an invalid data code was detected in the timing frame received during the past 50 m sec. period. When bit positions 11 and 12 are both logical ones, an invalid time update was detected during the previous 50 m sec. period.

Bits 12 and 13 provide snychronization information. If bits 12 and 13 are both zeroes, the timing subsystem is not enabled to synchronize on received timing frames or with A.C. reference timing signals for its power supply 34. If bit 13 is a zero and bit 12 a 1, the timing system is synchronized to the frequency of its A.C. power supply. If bit 13 is a one and bit 12 a zero, the timing subsystem is synchronized with the receipt of synchronizing codes of received timing frames. Bits 15 and 14 identify the mode of operation of the timing subsystem. If bits 15 and 14 are both zeroes, the timing subsystem is operating in the master clock source mode. If bit 15 is a zero and bit 14 is a 1, the timing subsystem is operating in the slave clock source mode. If bit position 15 is a 1 and bit position 14 is a zero, the timing subsystem is functioning in the listener only mode. If bit positions 15 and 14 are both ones, the timing subsystem is in its local mode of operation.

Receiver Mailbox (RCMBOX) 94 is a 12 byte register in which each timing frame as received is stored. Received time image (RTI) register 96 is a 6 byte register in which the decoded, or translated data from a timing frame 60 stored in receiver mailbox 94 is placed. The expected time image (ETI) register 98 is a 5 byte register in which is written the number of 50 m sec. that have elapsed in the 1 second period as well as the number of seconds constituting the current time. The source of the number of 50 m sec. signals loaded into register 98 is the content of accumulated synchronization timing signal (ASTS) register 86 incremented by 1, so that the contents of ETI register 98 will correspond to the timing information included in the next timing frame 60 received or transmitted by a timing subsystem 48.

Transmit mailbox TXMBOX register 100 is a 12 byte register that holds the 12 bytes of an encoded timing frame 60, which timing frame 60 will be transmitted by a master or slave timing subsystem over the local control network buses 14A or 14B when the next 50 m sec. or 1 second timing signal, or interrupt, is produced by microprocessor 56 and interrupt generator 63.

Microprocessor 56 of timing subsystem 48 does not generate directly the code written into its TXMBOX 100. The method of producing the coded data of a timing frame 60 is to translate each nibble, four bits of data, from ETI register 98 and the least significant four bits of status register 92 by conventional table look-up techniques into a set of binary digits in which no two logical zeros occur in sequence. This technique allows the transmission of one nibble per byte of the NRZ code. The NRZ zero interval following each logical one allows the use of the trailing edge of the NRZ code as a signal which generates a negative going sinusoidal shaped pulse on the line to restore its D.C. level. The reason for this is that local control network cables 14-A and 14-B cannot support D.C. wave forms, thus simple NRZ transmissions cannot be used. This limitation is overcome by transmitting wave forms on cables 14-A, 14-B in which a logical zero corresponds to a positive going sinusoidal pulse followed by a negatively going sinusoidal pulse. A logical 1 is the absence of such a pulse pair.

In FIG. 4, the format of a timing frame 60 is illustrated, each character contains one nibble, or four bits, of usable data. Eight characters of accumulated seconds information are included within each timing frame 60. The least significant nibble (LSN) is transmitted first and the most significant nibble (MSN) is transmitted last. The status character is coded data representing the least significant 4 bits of status register 92.

In FIG. 5, the format of the synchronization code, or character, 102 is illustrated. The first bit, a logical zero, is a start bit, and the last bit is a stop bit. The stop bit identifies the end of the character being transmitted bit serially and is always a logical 1. The next to last bit position is a parity bit.

Timing subsystems 48 of each physical module 12 of local control network 10 have two possible configurations. If they are designed to transmit timing frames 60 the format of each of which is illustrated in FIG. 4, they are provided with a timing subsystem driver 50. If they are intended to merely receive timing frames from LCN bus 14, then a timing subsystem driver 50 is omitted. Otherwise, all timing subsystems are the same and function as described above.

A timing subsystem 48 is placed into its local mode of operation following initialization. When in this mode of operation, a timing subsystem 48 can be synchronized to the frequency of its power supply 34, if commanded to do so by its associated MCPU processor 36, and if the frequency of the A.C. applied to its power supply 34 is within specified limits. If a timing subsystem 48 is instructed by its associated MCPU processor 36 not to synchronize its internal sense of time with the A.C. reference timing signals produced by power supply 34, it will cease doing so. Zero time for the first 50 m sec. period is established when the local mode is selected during initialization. If the A.C. reference timing signals are valid, the power line synchronization interrupt service route notes the number of 100 u sec. interrupts in a 50 m sec. period at which the fifth or the sixth A.C. reference timing signal is received from power supply 34. If A.C. power supply 34 is connected to 50 $H_z$ power, the fifth A.C. reference timing signal will occur once each 50 m sec. period. If 60 $H_z$ power is connected to power supply 34, the sixth A.C. reference timing signal occurs once each 50 m sec. period. The power line frequency synchronization (PLFS) interrupt service routine (ISR) performs a measurement of the time at which the 5th or 6th A.C. reference timing signal is received by comparing the current value of ATR 80 with the expected value contained in line synchronization measurement reference register (LSMR) 84. LSMR 84 is loaded with the contents of the ATR 80 by the PLFS ISR upon the 1st receipt of an A.C. reference timing signal after timing subsystem 48 is instructed to synchronize its internal sense of time to the frequency of the of A.C. power source. The contents of counter 74 is adjusted by ±50 u sec., when required, so that the value of the ATR 80 count at the receipt of each successive 5th or 6th A.C. reference timing signal is the same as the original value contained in the LSMR 84.

The internal sense of time of timing subsystem 48 is found in course resolution interpolation register 82 and course resolution accumulated second register 88. Both are set to zero during initialization. During the servicing of each 50 m sec. interrupt, registers 82 and 88, are updated by the timing information in expected time image table 98. In between each 50 m sec. interrupt, CRIR 80 is incremented each 100 u sec. a maximum of 500 times. The contents of course resolution interpolation register 82 is presented each 100 m sec. to its associated external register file register 68. The contents of accumulated seconds register 88 is presented to its external register file 68 at the completion of each one second period. External status register 70 is updated each 50 m sec. and the proper interrupt vector generator address provided to interrupt generator 63 in preparation for the posting of the next interrupt request to MCPU processor 36.

A timing subsystem 48 which is operating in the local mode may be requested at anytime to synchronize its internal sense of time with recept of timing frames transmitted over cables 14A and 14B, or to switch to the receive cable mode; or if it is provided with a timing subsystem driver 50 to the slave clock source mode. When such a change of mode is ordered, a timing subsystem 48 must adjust its internal accumulated ticks register 80 to expect a 50 m sec. synchronizing interrupt when its count reaches 500. To do this, timing subsystem 48 must identify the synchronizing code 102 when it is received from one of the two LCN cables LCN-A or LCN-B, and produce a 50 m sec. interrupt and reset its ATR 80 to zero.

The incoming timing frame 60 is buffered in registers 94 and 96 to permit examination to determine if it has the proper length, has the right parity, and to check for resonableness as to the informational and content except when a time set is in progress which is denoted by a logical 1 in status bit position 00. The count contained in the ATR 80 at the time the first character, the synchronizing code 102, is received is checked to see if it is 500±3. If it is, the timing of the receipt of code 102 is considered to be valid, and ATR 80 is set to zero as described above. The four bytes of timing data contained in a timing frame 60 are obtained by decoding the eight characters of accumulated seconds of a timing frame temporarily stored in register 96.

Interpolation register 68 is updated with the contents of register 82 each 100 u sec. except when the ATR 80 count is 501, 502 or 503 i.e. synchronizing code 102 is late. In this case the contents of course resolution interpolation register (82) remain at the 500th count for the current 50 m sec. period and no update of the interpolation register 68 is performed. When ATR 80 reaches 504 and if the synchronizing code 102 has still not been received, the contents of register (82) is incremented by 4 and is used to update interpolation register 68.

CRAS register 88 is updated if a time set time frame is received so that the interrupt presented to MCPU processor 36 by its timing subsystem 48 at the one second mark is denoted a status change interrupt. Finally, status register 92 is updated. It should be noted that interpolation register 68 is updated at each 100 u sec. except as described above. If the synchronizing code 102 is received late, interpolation register 82 remains frozen at a count which represent the 500th 100 u sec. count of the current 50 m sec. period until the first 100 u sec. interrupt occurs following the receipt of the character, or at the 504th 100 u sec. count of the present 50 m sec. period, whichever comes first. If the synchronizing code occurs at a ATR 80 count of 497, 498 or 499, ATR 80 is set to zero, the course resolution interpolation register 82 is incremented by 3, 2 or 1 respectively and this data is used to update interpolation register 68. Information loaded into accumulated seconds register 66 is a copy of the accumulated seconds portion of the course resolution timetable internal registers 88 and 82.

There are two methods of synchronizing the operation of the timing subsystem, one is power line synchronization and the other is received message synchronization. A master clock timing subsystem, an unlocked slave timing subsystem, and timing subsystem which are selected to operate in local mode only may be synchronized to the power line frequency if the timing of the frequency of the external source of A.C. electric power is accurate, or valid. If not valid, the internal sense of time, the contents of registers 82 and 88, rely on clock signals produced by module clock 44 which have an accuracy of ±0.05%. Slave clock timing subsystems and listener, or receive only, timing subsystems 48 synchronize their internal sense of time by producing internal synchronization interrupts upon the receipt of the synchronizing code 102 of each timing frame 60.

Synchronization means an adjustment of the internal sense of time of a timing subsystem 48; namely, by updating the content, or count, of ATR 80 to match that of the master or slave source of each timing frame 60 as received. Externally of a timing subsystem 48, synchronization means an adjustment to interpolation registers 82 and 68, every 50 m sec.; and, if needed, an adjustment to accumulated seconds register 88 and 66 at each one second rollover. The 50 m sec. portion, or content, of ETI register 98 is determined earlier in each 50 m sec. period by microprocessor 56 updating the contents of CRIR register 82 and CRAS register 88 to the time when the next 50 m sec., or one second interrupt is to be produced.

For those timing subsystem 48 which are provided with a timing subsystem driver 50, and thus are capable of transmitting a timing frame 60, one such transmitter is designated as a salve and the other as a master. A slave will, at approximately 400 u sec. prior to an expected 50 m sec. mark, or 50 m sec. interrupt, start transmitting the timing frame stored in its transmit mailbox 100. Upon receiving a valid interrupt associated with the receipt of the first character of timing frame 60, synchronizing code 102, ATR register 80 is zeroed which starts the next 50 m sec. cycle. If the master timing subsystem fails or is deemed to have failed, a slave timing subsystem will continue to operate using its own internal sense of time derived from its module clock 44 until the direction of the third missing or invalid synchronizing code from the master timing subsystem. At that time a slave timing subsystem will start synchronizing to the frequency of the power line if available, and if not previously commanded to disregard it. If no valid power line synchronization signals are available, a slave timing subsystem will operate using clock signals from its crystal controlled module clock 44.

Transmit mailbox register 100 is updated shortly prior to a 50 m sec. mark. TX mailbox 100 is reloaded with coded time information from ETI register 98 which is equal to the contents of CRAS 88 and the present 50 m sec. count of ASTS register 86 incremented by one, plus the lower order four bits of status register 92. If the next transmission of a timing frame will be on a one second boundary, the 50 m sec. count will be set to zero and the accumulated seconds information will be incremented by one.

If a timing subsystem 48 is designated as a master its function will be the same as that of a slave as described above except that synchronization is based on the frequency of its A.C. power if valid, and not on received timing frame interrupts.

The 100 u sec. time or count from CRIR 82 is written into interpolation register 68 at each 100 u sec. interrupt External status register 70 is updated near the end of each 50 m sec. period, and accumulated seconds register 66 is updated at each one second interrupt. A timing subsystem 48 will produce and transmit to its MCPU processor 36 by means of interrupt generator 63 an interrupt at each 50 m sec. and one second interval. Each interrupt includes a vector which is a function of the time at which the interrupt occurs and if a time or status change is being reported. The three vector numbers correspond to a 50 m sec. interrupt, a one second interrupt, and a status change interrupt. A status change interrupt may be presented at either a 50 m sec. or one second period in lieu of a 50 m sec. or one second interrupt. If a previous interrupt request has not been serviced by MCPU processor 36 before a another interrupt is to be generated, the status change interrupt is queued. When this occurs, a status bit is set in bit position 07 in status register 98 to indicate that one or more interrupts have not been serviced by MCPU processor 36. This status bit will remain set until the first interrupt following the presentation of the queued status change interrupt to MCPU 36.

In the operation of a timing subsystem 48, errors consist of the absence of an expected synchronizing interrupts within the allowed window, or time period. Thus a synchronizing code of a timing frame must be received at 50 m sec. ±300 u sec.; and if the timing subsystem is synchronized to the power line frequency, then the fifth or sixth A.C. reference timing signal must be received at ±200 u sec. of the time it is expected. Other types of errors are based on the contents of a received timing frame 60, either a parity error, an incorrect message length, an invalid data code, or the time data is not that predicted. Status register 92 is updated as errors are detected. For error counts which are less than a specified maximum number, no change detect interrupt, mode change, or change in synchronization selection is performed. When an error limit is reached one or more of the following occurs. A listener, or receive only, timing subsystem 48 will change to local mode of operation upon the loss of cable synchronization. It may then synchronize on the frequency of its A.C. power supply if valid. A slave timing subsystem will go from being locked to, or synchronized with, timing frames transmitted by the master timing subsystem to the unlocked slave clock source mode upon the loss of the master cable. An unlocked slave timing system will synchronize on the power line frequency if valid. It will continue to receive timing frames transmitted by it from one LCN cable, or not receive from either if the error counts for both cables exceed a predetermined level, three in any one second period in the preferred embodiment. If synchronization to power line frequency is lost by a master for any reason, and or by any timing subsystem in local mode each such subsystem will continue to operate relaying on the its associated module clock 44. In all cases the internal sense of time based on the MCPU's crystal clock 44 is assumed to be correct. A timing subsystem operating in a degraded mode will remain in the degraded mode until instructed otherwise by its module CPU 36.

A timing subsystem 48 will produce the following types of internal interrupts. One occurs at 100 u sec. intervals. A second is an external interrupt type zero which is a command request interrupt. A third is designated as an interrupt type one which is generated for each falling edge of the A.C. timing reference signal produced by its power supply 34. The fourth interrupt, designated as a serial data transmit or receive interrupt, is produced for each of the 12 characters of a receive timing frame.

Certain operational tasks are scheduled to be executed by microprocessor 56 once during each 50 m sec. period. The tasks executed by microprocessor 56 depend upon the functional mode of operation of its timing subsystem 48. These unique tasks are performed at predetermined times within a 50 m sec. period. The mode of operation, local mode, clock source mode, and listener mode determine the tasks to be executed and their timing. These tasks include checking received timing frames 60 for validity, updating registers 82 and 86, checking for error limits or mode changes, processing commands for mode changes, synchronization selection changes or time information updates. Microprocessor 56 also updates TXMBOX 100, prepares RCMBOX 94 to receive a transmitted timing frame 60 and enables interrupt generator 63 so that it can produce the appropriate interrupt each 50 m sec. and one second period. In addition microprocessor 56 updates external status register 70, determines the proper vector for the next interrupt to be produced by interrupt generator 63, and initiates the transmission of timing frames 60 at the appropriate time. Not all these tasks, however, are performed in all modes of operation of a timing subsystem 48.

Each timing subsystem 48 maintains its own internal sense of time. When a timing subsystem 48 is ordered to synchronize itself to timing frames received from LCN-A and LCN-B, it monitors the timing frames 60 received to identify the synchronizing code 102 of each received timing frame 60. If a synchronization code 102 arrives at the expected time ±300 u sec. the internal sense of time is synchronized to the interal sense of time of the transmitter, master or slave, by clearing its ATR register 80 to zero.

A similar adjustment is required when a clock subsystem 48 is commanded by its MCPU processor 36 to synchronize itself to the frequency of its A.C. power source, more particularly to the A.C. timing signals produced by its power supply 34. There is, however, one important difference. When synchronization to the frequency of the A.C. power supply is initiated, no immediate adjustment of the internal sense of time, which includes the contents of counter 74 and ATR register 80, register 86, and register 88 is made. During following 50 m sec. cycles, the internal sense of time is adjusted as required by ±50 u sec. which is added or substrated to the contents of counter 74 to maintain synchronization with the frequency of A.C. power supply.

The medium resolution portion of the internal sense of time is maintained by ASTS register 86. ATR 80 is adjusted by being cleared to zero when a valid synchronizing interrupt is being serviced. The contents of ASTS 86 is also adjusted when a valid synchronizing interrupt is produced; i.e., once every 50 m sec. The initial sense of time is adjusted to maintain synchronization with the frequency of its A.C. power supply by adjusting the contents of fine resolution counter 77 by ±50 mu sec. as required. ATR register 80 also provides the time reference used in determining if synchronization code 102 interrupts are occurring within the expected window. The line synchronization measurement register count 84 provided the reference time used to determine if A.C. timing reference synchronizing interrupts are occurring within the expected time window.

If a timing subsystem 48 is synchronized to received timing frames 60, and if synchronizing interrupts produced as the result of receiving synchronizing codes 102 or produced within the expected time window, the internal sense of time as reflected by ATR-80 is zeroed. This establishes a new zero time for the next 50 m sec. period. If a timing subsystem 48 is synchronized to received timing frames 60, more particularly to the recept of its synchronization code 102 and a synchronizing interrupt does not occur by 50 m sec. +400 mu sec., or 50,400 mu sec. since the previous synchronizing interrupt, the interrupt is declared invalid, ATR register 80 is set to 4, and CRIR 82 is incremented by 4. In addition, interrupt generator 63 is disabled until later in the next 50 m sec. period, and the error count for the cable over from which that timing frame was transmitted is incremented by one.

It should be noted that interpolation register 82 is never incremented beyond the 500th count of a given 50 m sec. period. If a synchronizing code 102 is not received, and thus a synchronizing interrupt is not produced by the 500 through and including the 503rd 100 u sec. interrupt, interpolation register 68 is not incremented beyond 500. If a synchronizing interrupt is not received by the 504th 100 u sec. interrupt, or tick, interpolation register 82 and 68 are incremented by four. Similarly, ATR register 80 is set equal to four and the appropriate interrupt is generated. The vector number of the last interrupt will have been previously established by microprocessor 56 so that if this was the third occurrence of the receipt of an invalid synchronization code from the same transmitting timing subsystem, the posting of this error will be accomplished at the next 50 m sec. interrupt produced by a timing subsystem 48.

The process of initiating the transmission of a timing frame 60 by a master and a slave timing subsystem 48 begins at approximately 400 u sec. prior to the expected 50 m sec. mark. A timing subsystem 48 which is receiving these transmissions will generate a synchronizing interrupt upon recept of the synchronizing code 102 which occurs approximately 400 u sec. after the synchronization code 102 timing frame 60 is loaded into the master or slave transmit mailbox 100. As a result, the timing subsystem 48 receiving the timing frame 60 produces a synchronizing interrupt at the transmitters 50 m sec. and one second marks. These synchronizing interrupts should occur within a margin, or window, of ±300 u sec. of the time each receiving timing subsystem 48 expects to generate this interrupt.

If a timing subsystem 48 is synchronized to the frequency of its A.C. power supply, a check is performed to insure that every 5th A.C. reference timing signal, if the frequency of the source is 50 cycle A.C.; or the 6th A.C. timing reference signal if the frequency of the source is 60 cycle A.C. is received, at the same count of ATR register 80. As pointed out supra, A.C. reference timing signals are produced by a power supply 34 at twice the frequency of the A.C. power supply. If the 5th or 6th half cycle A.C. references timing signal; is produced within the permitted window ±200 u sec., but is not produced at exactly the expected time i.e. the contents of register 84 does not exactly match the value of ATR 80 at the occurrence of the 5th or 6th A.C. timing reference signal a speed up or a slow down indicator is set, or cleared, as required by the PLFS interrupt service routine of microprocessor 56. This information is used by the 100 u sec. interrupt service routine to adjust the count of counter 74 by ±50 u sec. If the adjustment value is zero, no adjustment is necessary, and the 100 u sec. interrupt routine will perform no adjustment to counter 74. If the 5th or 6th half cycle interrupt is not within the required window, an error flag is set, and no adjustment is made to counter 74 during the current 50 m sec period. The internal error count for the power source is incremented by one. If the error is the third during a one second period, a change detect interrupt is generated at the completion of the present 50 m sec. period.

A timing subsystem 48 can be placed into the local mode of operation following initialization and self-test. In this mode of operation synchronization is obtained using A.C. reference timing signals produced by power supply 34. If valid by making adjustments to the count of counter 74 not more often than once in each 50 m sec. period. If a timing subsystem 48 is ordered by its associated MCPU processor 36 to disable its line synchronization mode of operation, a timing subsystem 48 no longer uses A.C. reference timing signals to produce the interrupts needed to synchronize its internal sense of time to that of the frequency of its A.C. power supply.

A zero time for the first 50 m sec. is established when the local mode of operation is selected during initialization. If the frequency of the A.C. reference timing signals is valid, the power line synchronization interrupt service routine will count the number of power line interrupts and cause the 100 u sec. service routine to adjust fine resolution counter 74 as required. The internal sense of time, including interpolation register 82 and internal accumulated seconds register 88 is initially set to sero during initialization. Starting at time zero the following tasks are executed each 50 m sec. period. Course resolution timetable registers 88 and 82 are updated from the contents of expected time image register 98. This information is presented to registers 66 and 68 of register file 64 at the completion each 50 m sec. period. The line synchronization error count is checked and a mode change is made from the line synchronization mode to local mode if the number of synchronization errors is at its limit. The command processing routine of microprocessor 56 will periodically check command register 58 for new commands stored therein. If there is a new command it is processed.

The receive alternatively LCN cables A&B and the enable slave clock source mode commands may not result in an immediate mode change. A synchronization character monitor routing is activated to time the receipt of the synchronization code, of character 102 from the selected cable. Upon the next entry into the, command processing routing microprocessor 56 checks to see if a synchronization code 102 was detected. If not, a second attempt is made to receive a synchronization code 102 of a timing frame 60 on that cable. Synchronization detection is tested once again during the next execution of the command processing routine. If a synchronization code 102 is not detected during the second attempt, the other LCN cable is selected and two more attempts are made to receive a synchronization code 102 from the second LCN bus before it is determined that the command cannot be obeyed. Finally, the external status register is updated and the proper interrupt vector generator address is provided to interrupt generator 63 in preparation for posting of the next interrupt request.

A timing subsystem 48 which is operating in the local mode may be requested at anytime to switch to the receive timing frame mode or the enabled slave clock source mode if provided with a driver circuit 50. When such a mode change to requested, a timing subsystem must adjust, the contents of its accumulated ticks register ATR 80 so that it will expect a 50 m sec. synchronization interrupt at the proper time. To accomplish this, the timing subsystem must identify the cable from which a timing frame is received check to see if it is valid and then synchronize its internal sense of time with the transmitter timing subsystem.

The master clock source mode and the slave clock source mode differ primarily in the manner in which modes of operation are selected. The master clock source mode is selected by a MCPU processor 36 issuing the appropriate command to its timing subsystem 48. A slave clock source (unlocked from the master) mode is an automatic fail over mode selected by a slave timing subsystem after the third detection of an erroneous message within a one second period from the cable over which the master timing subsystem is transmitting timing frames 60. Synchronization of the internal sense of time of a slave timing subsystem 48 in the unlocked from master mode is then with the frequency of the poewr A.C. supply if valid. Otherwise no synchronization is performed.

Timing subsystems 48 which are not synchronized to synchronizing codes 102 of received timing frames 60 start each 50 m sec. cycle under the control of the 100 u sec. interrupt service routine at the receipt of the 500th 100 u sec. interrupt. If synchronization to the power line frequency is occuring a power line synchronization interrupt service routine may identify that an adjustment to the internal sense of time is necessary, then the adjustments are made to counter 74 to slow down or speed up the occurrence of the next 100 u sec. interrupt by ±50 u sec. If power line synchronization is not selected no adjustment to counter 74 is made.

Possible commands that can be issued by a MCPU processor 36 to its timing subsystem 48 are an "enable master mode" command and a "receive alternately cables A&B" command. When an enable "master mode command" is received, a timing subsystem 48 will continue to update periodically its transmit mailbox 100. Received timing frames 60 will be checked for validity during the next 50 m sec. period, and timing frames will be received alternately from the two cable LCN-A and LCN-B. However, when in master mode, a timing subsystem 48 does not synchronize its internal sense of time to the receipt of synchronizing codes of each timing frame 60. Synchronization if any will continue to be based on the frequency of the A.C. power supply.

When a timing subsystem 48 is commanded to function in the slave mode, such a mode changes requires a synchronization source change from that of the frequency of the A.C. power to that of the synchronizing code of received timing frames 60. Therefore, to avoid synchronizing on its own tranmission, a slave timing subsystem 48 does not transmit a time timing frame starting 400 u sec. prior to the completion of a 50 m sec. period, but uses its monitor interrupt service routine to adjust its internal sense of time so that it is synchronized to its receipt of the synchronization code 102 of each timing frame 60 from the master. Four attempts are allowed for synchronizing to the timing frame transmitted by a master timing subsystem 48. Thus, the enabled slave clock source mode command is not implemented until synchronization with the master is accomplished, or until it is determined that the command cannot be completed. During first cycle after synchronizing with the master, a slave timing subsystem copies the received time into its expected image register 98, and from this point on receives alternately the masters transmissions on its own over LCN-A and LCN-B.

The receive alternately cables A&B command causes a slave timing subsystem 48, which is not locked to the master, to treat the command in the same manner as an enable slave mode command. A timing subsystem in master mode will also respond to this command as being the same as an enable master command. A slave timing subsystem which is synchronized to timing frames received from the one cable over which the master transmits these receiving this command will then start to receive timing frames alternately from each cable. Slave timing subsystems synchronized with the master, and timing subsystems which are listeners only, synchronize their internal sense of time to the receipt of timing frames received over LCN-A and LCN-B. The major difference between the two modes of operation is that a listener only timing subsystem is not required to form and transmit timing frames 60. If synchronization is lost, defined as being the receipt of three invalid messages from the master within a one second period for a slave clock source, and three invalid messages from both cables in a one second period for a listener only timing subsystem, synchronization is switched to the frequency of the A.C. power line if valid. If not valid each timing subsystem relies on clock pulses from its module clock 44 to maintain its interal sense of time. Only listener only timing subsystems which were previously synchronized with received timing frame 60 will change to the local mode of operation if synchronization is lost. The operation of a slave timing subsystem which has become unlocked from the master is described above.

For timing subsystems which are synchronized to received timing frames 60, (locked slave, and listeners) each 50 m sec. period is started with either the receipt of the synchronizing code 102 of the current timing frame 60 or the receipt of the 504 100 u sec. interrupt.

The objective of the local to receive cable transition procedure is to provide a change in the synchronization source from the frequency of the power supply or nothing, to received timing frames and the interrupts produced when a synchronization code is received. This procedure is executed when the command is received from the timing subsystem's MCPU microprocessor to enable slave clock source mode or to receive alternately cables A&B.

Concurrently filed with this application are three applications relating to the transceiver 18, to timing subsystem driver 50, and to synchronizing the internal sense of time of a timing subsystem with the frequency of an internal A.C. power supply. These applications are entitled Dual Frequency Bus Transceiver by Robert L. Spiesman; Timing Subsystem Driver by Robert L. Spiesman; and Real Time Clock Synchronizer by David L. Kirk and Robert L. Spiesman. Each of these applications is assigned to Honeywell Inc. as in this application. The disclosue of the above identified applications are hereby incorporated by reference into this application.

From the foregoing it is clear that this invention provide methods and approached for synchronizing the timing subsystem of each of the modules of a local area network within a predetermined degree of accuracy and which satisfy the objects of this invention.

It should be evident that various modifications can be made to the described embodiment without departing from the scope of the present invention.

What is claimed is:

1. The method of providing synchronized and accurated timing in a distributed local area network, which network includes a plurality of modules which communicate with each other over a network bus, each module including a module central processing unit (MCPU); each MCPU including a source of clock signals, the periods of the clock signals of each of the sources of clock signals being substantially equal; each MCPU including a digital timing subsystem to which the clock signals of the sources of clock signals are applied, each of the timing subsystems producing a fine resolution timing signal, a synchronization timing signal, and a real time timing signal, each such signal having a different period; each timing subsystem also maintaining its current real time, the number of fine resolution timing signals and the number of synchronization timing signals produced since the most recent real time timing signal was produced, and the number of fine resolution timing signals produced since the last synchronization timing signal was produced; said method comprising the steps of:

designating the timing subsystem of one of the MCPU's as a Master Timing Subsystem (MTS)

causing the MTS to transmit a timing frame over the network bus to all of the other MCPU's of the netowrk, each timing frame including a synchronizing code, the number of synchronization timing signals since the last real time timing signal was produced by the MTS, and the current real time;

causing said MTS to time the transmissions of each timing frame so that the synchronizing code of each timing frame is received by the other modules substantially at the same time as the next synchronization timing signal is produced by the MTS; and causing each timing subsystem receiving a timing frame other than the master to synchronize its count of the number of fine resolution timing signals with that of the MTS, and its current real time with that of the MTS.

2. The method of claim 1 in which the network bus includes a pair of parallel coaxial cables, and further includes the step of:

designating a second timing subsystem as a slave timing subsystem:

causing the salve timing subsystem to transmit timing frames over one cable and the master timing subsystem to transmit timing frames over the other.

3. The method of claim 2 which further includes the step of causing selected ones of said timing subsystem to synchronize the production of its timing signals with the frequency of its external A.C. power supply.

4. The method of claim 3 which further includes the step of: enabling the master timing subsystem to synchronize the production of its timing signals with the frequency of the A.C. power supply.

5. The method of claim 4 which further includes the step of enabling each digital timing subsystem to produce fine resolution, synchronization timing and real time timing signals and to maintaining its current time independently of the frequency of its A.C. power supply and of timing frames transmitted by a master or a salve if these sources fail.

6. The method of claim 5 which further includes the step of:

causing each timing subsystem to check to see if timing frames are received within an expected time period ± a predetermined window, and causing each timing subsystem to synchronize its current real time to that of the transmitting timing subsystem only if timing frames are received within said expected time period plus the predetermined window.

* * * * *